United States Patent [19]

Nakamura et al.

[11] Patent Number: 5,008,756
[45] Date of Patent: Apr. 16, 1991

[54] VIDEO CAMERA SYSTEM WITH AUDIO SWITCHING CIRCUIT

[76] Inventors: Takashi Nakamura; Yoshimi Yasukochi; Tamotsu Munakata; Masaharu Nakashima, all of c/o Sony Corporation, 7±, Kitashinagawa 6-chome, Shinagawa-Ku, Tokyo, Japan

[21] Appl. No.: 509,761

[22] Filed: Apr. 17, 1990

[30] Foreign Application Priority Data

Apr. 21, 1989 [JP] Japan ................. 1-P102091
Apr. 25, 1989 [JP] Japan ................. 1-P105076

[51] Int. Cl.$^5$ ............................................. H04N 5/30
[52] U.S. Cl. ................................. 358/210; 358/181; 358/186; 358/85
[58] Field of Search ............... 358/210, 181, 185, 186, 358/188, 189, 174, 85; 381/105; 379/53, 160

[56] References Cited

U.S. PATENT DOCUMENTS

| | | | |
|---|---|---|---|
| 4,264,928 | 4/1981 | Schober | 379/53 |
| 4,300,166 | 11/1981 | Marey | 358/210 |
| 4,326,221 | 4/1982 | Mallos et al. | 358/210 |
| 4,961,211 | 10/1990 | Tsugane et al. | 358/85 |
| 4,965,819 | 10/1990 | Kannes | 379/53 |

FOREIGN PATENT DOCUMENTS 080771 8/1983 European Pat. Off. .

OTHER PUBLICATIONS

Television Engineering Book, K. Blair Benson, pp. 14.1148 & 14.115, McGraw-Hill Book Company.

Primary Examiner—Howard W. Britton
Assistant Examiner—Tuan V. Ho

[57] ABSTRACT

A video camera system is composed of a camera head unit having an imager and a microphone, a camera control unit connected to the camera head unit through a coaxial cable for controlling the camera head unit, and a microphone for transmitting an output signal through the coaxial cable to the camera control unit. According to this video camera system, a noise component entered the camera control unit from the camera head unit can be reduced, two communication systems can be independently utilized, and a noise component in the coaxial cable can be reduced considerably. In addition, it becomes possible to widen a dynamic range.

5 Claims, 6 Drawing Sheets

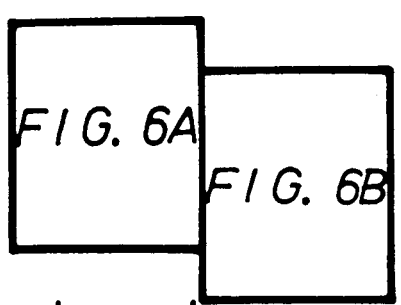
FIG. 6A
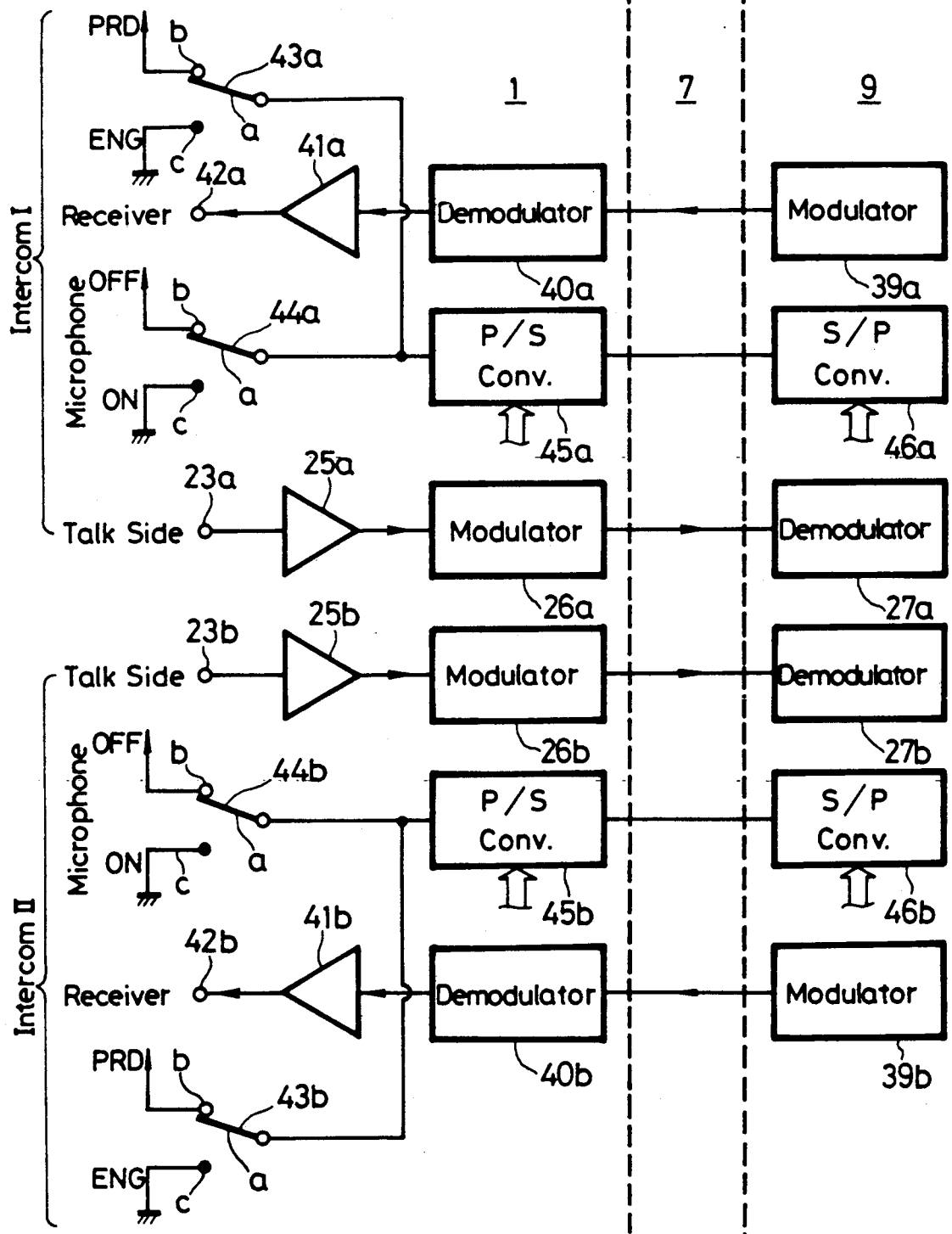

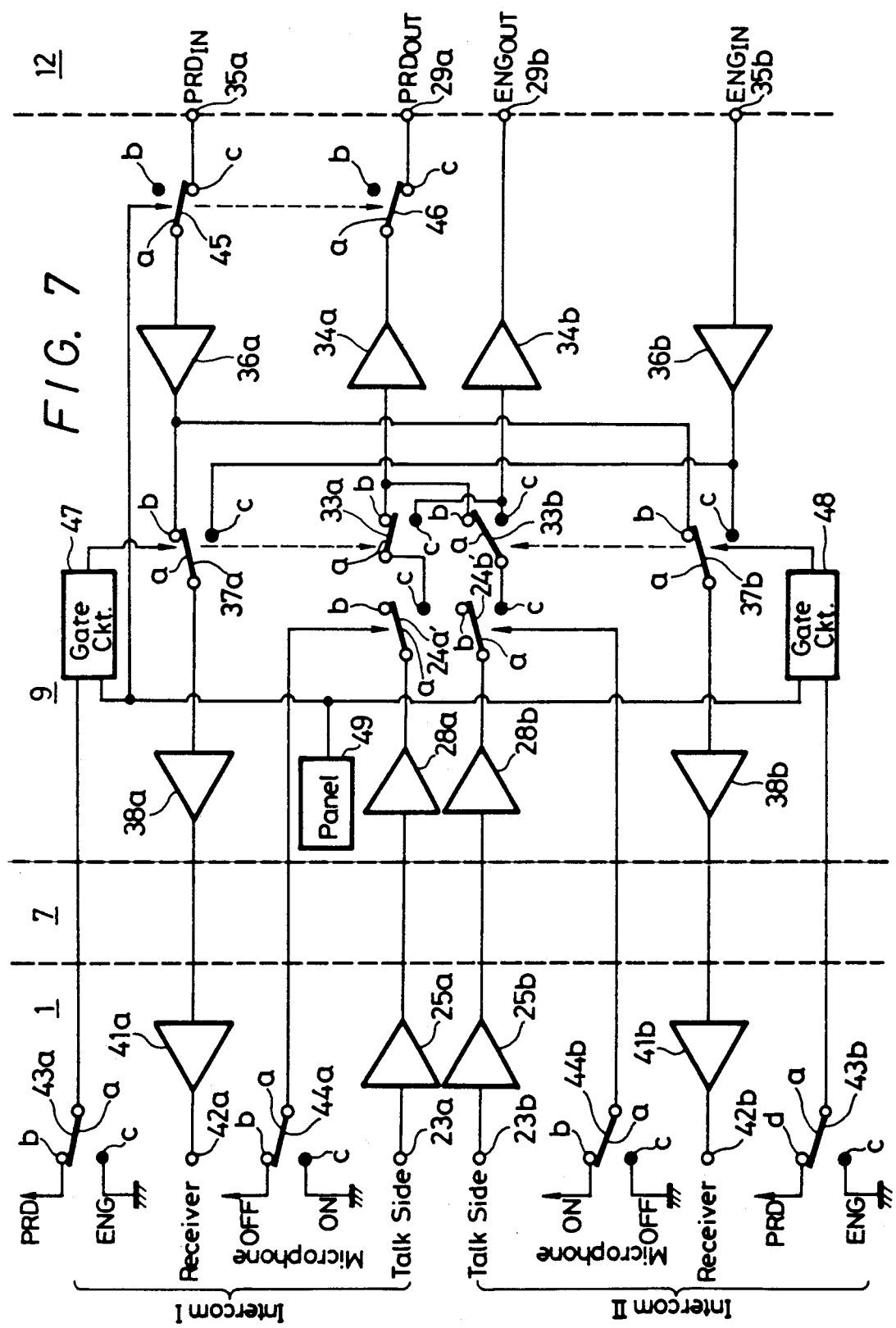

VIDEO CAMERA SYSTEM WITH AUDIO SWITCHING CIRCUIT

BACKGROUND OF THE INVENTION

1. Field of the Invention

The present invention relates generally to video camera systems and, more particularly, is directed to a video camera system suitably applied to a communication between a camera head unit and a camera control unit.

2. Description of the Prior Art

A prior-art video camera system for a studio or for a field pick-up van is constructed as shown in FIG. 1.

Referring to FIG. 1, there is shown a camera head unit (CHU) 1, i.e., a video camera body which is comprised of a solid state imager such as a charge coupled device (CCD) and the like, a head amplifier, a lens 4 of an image pick-up system and so on. Further, the camera head unit 1 includes a viewfinder 2, a microphone 3 for collecting a sound when a cameraman takes a picture, and a headset 5 composed of a headphone (not shown) and a microphone (not shown) and which is worn by the cameraman on the head or the like to communicate with the studio.

The camera head unit 1 derives a video signal 8 such as, a luminance signal Y (8a), a color difference signal U/V (8b) and the like. This video signal 8 is transmitted through a coaxial cable 7 to a camera control unit (CCU) 9 located in the studio or in the field pick-up van 10 side. The video signal 8 picked-up by the aforenoted video camera is, for example, FM-modulated and transmitted through the coaxial cable 7. The camera control unit 9 generates control and adjusting data, etc.

Within the studio or the field pick-up van 10, there are provided a control panel 11 for performing video signal processing, an audio mixing console 12 for mixing audio signals, etc. While watching a monitor receiver 17, an audio level meter (not shown) or the like, a video and audio mixer 14 adjusts the image signal and the sound signal supplied thereto from the camera head unit 1, whereby a video signal 15 and an audio signal 16 are converted, for example, to an NTSC television signal and broadcast.

In addition to the luminance signal 8a and the color difference signal 8b forming the video signal 8, data 19, a return video signal 22, a first microphone signal 20L, a second microphone signal 20R, an intercom signal 21, a power source voltage signal 18 such as an AC voltage signal of 240 V, etc., are transmitted through the coaxial cable 7 connecting the above-described camera head unit 1 and camera control unit 9, as shown in the signal allocation of FIG. 2. The return video signal 22 is a video signal transmitted to the camera head unit 1 side from the camera control unit 9 side through the coaxial cable 7 such that a video signal picked-up at the camera head unit 1 side and which is adjusted, received and reproduced by the control panel 11 while watching the monitor receiver 17 is transmitted through the camera control unit 9 and can be again reproduced at the viewfinder 2 provided at the camera head unit 1 side.

As shown in FIG. 2, the DC or AC voltage source signal 18 utilized in the circuits (not shown) at the camera head unit 1 side is transmitted as a voltage signal of, for example, AC voltage of 240 V. Left and right audio signals collected by the microphone 3 are transmitted as the first and second microphone output signals 20L and 20R. The intercom signal 21 is used to communicate the cameraman 6 who operates the camera head unit 1 with the video or audio mixer 14 in order to discuss technical problems or to make broadcast programs. The data 19 are control data which are utilized for the camera control unit 9 side to adjust white balance, automatic iris control and the like in the camera head unit 1 side. These signals or data 19 are frequency-divided and frequency-multiplexed so that they can be transmitted to two directions.

FIG. 3 is a block diagram showing a transmission system of the above-described intercom signal 21, in particular, a so-called talk side thereof.

As shown in FIG. 3, a plurality of video camera apparatus, i.e., camera head units 1 are connected through a plurality of camera control units 9 to, for example, the headset 13 of the mixer 14 at the audio mixing console 12 side, whereby the mixer 14 communicates with a plurality of cameramen 6, 6, ... who operate the plurality of camera head units 1, 1, ... via the intercom signal 21.

Referring to FIGS. 1 and 3, communication signals from the microphones of the headsets 5 worn by the cameramen 6 of n camera head units 1, 1, ... are supplied to input terminals 23a to 23n. The communication signals applied to the input terminals 23a to 23n are supplied through switches 24a to 24n to amplifying circuits 25a to 25n and are thereby amplified. The communication signals amplified are, for example, FM-modulated by FM-modulators 26a to 26n and transmitted through the coaxial cables 7 to the camera control unit 9 side, in which they are demodulated by demodulators 27a to 27n to provide original communication signals. The resultant communication signals are amplified by output amplifying circuits 28a to 28n and then supplied through output terminals 29a to 29n to an adding circuit 30 provided within the audio mixing console 12 in the studio or in the field pick-up van 10 and thereby added. The added signal is amplified by an amplifier 31, and is then transmitted through an output terminal 32 to the receiver of the headset 13 that the mixer 14 wears on the head. In other words, the mixer 14 can receive the communication signals from the plurality of cameramen 6, 6, ... at a time if the communications are performed simultaneously under the condition that the switches 24a to 24n provided at the camera head units 1 are turned ON.

According to the prior-art video camera system shown in FIG. 3, with respect to the side of the headset 13 worn by the mixer 14 who operates, for example, the audio mixing console 12 provided within the studio or field pick-up van 10, although the switches 24a, ..., 24n provided at the camera head unit 1 side are turned OFF, a noise level limit of the coaxial cable 7, for example, an FM noise produced through the modulation and demodulation circuits and the like are added to the communication signals and then outputted. For example, if there are provided 10 camera head units 1, the noise component is added 10 times as great and is then transmitted to the headset 13 side.

The intercom signal 21 shown in FIG. 2 is composed of two systems as shown in FIG. 4: One system is formed of intercom signals 21a, 21c (hereinafter simply referred to as $PRD_{IN}$, $PRD_{OUT}$) which are intercommunicated between the producer at the studio 10 side and the cameraman 6 in order to make the broadcasting program, and intercom signals 21b, 21d (hereinafter simply referred to as $ENG_{IN}$, $ENG_{OUT}$) which are used to communicate the cameraman 6 and the engineer at the studio 10 side in order to cope with a camera trouble and the like. Nevertheless, the intercom signal network lines of two systems are not limited to the producer or to the engineer and may be freely changed by the users. For this reason, if the two systems of the intercom signals of $PRD_{IN}$, $PRD_{OUT}/ENG_{IN}$, $ENG_{OUT}$ are switched as in the prior art, there occurs a problem of a cumbersome work for rearranging the matrix, when the intercom signals of two systems are utilized in various ways by the user.

FIG. 5 is a block circuit diagram useful for explaining a method of adjusting a level of an audio signal when an output signal such as an audio signal from the above-described microphone 3 or the like is transmitted from the camera head unit 1 side to the camera unit 9 side.

Referring to FIG. 5, the first or second microphone output signal 20L or 20R such as a left or right audio signal is collected by the microphone 3 and is then supplied to an input terminal 50. The microphone output signal 20L or 20R is supplied through a pre-amplifier 51 to a modulating circuit 52, in which it is, for example, FM-modulated. The thus FM-modulated signal is transmitted through the coaxial cable 7 to the camera control unit 9 side. Then, by a demodulating circuit 53 in the camera control unit 9 side, this transmitted signal is demodulated to provide a first or second original analog microphone output signal 20L or 20R. This first or second analog microphone output signal 20L or 20R is supplied to a variable gain amplifying circuit 54, in which it is controlled in gain, and is then fed through an output terminal 55 to the audio mixing console 12 provided within the studio 10. Thus, the gain-controlled signal microphone output signal 20L or 20R is adjusted to be a pre-determined level and is then broadcast.

Alternatively, the following audio level adjusting method has been used in the past. In this method, a audio gain adjusting device is provided at the camera head unit 1 side for manually adjusting the audio level. In that case, the mixer 14 at the camera control unit 9 side supplies from the headset 13 thereof the cameraman 6 with a gain level command via the intercom signal 21 so that the cameraman 6 determines a pre-determined level by operating the audio gain adjusting device on the basis of the command issued by the mixer 14.

According to the thus constructed prior-art video camera system, the first or second microphone output signal 20L or 20R is collected at the camera head unit 1 side with a pre-determined level, and the gain of the first or second microphone output signal 20L or 20R is adjusted by the variable gain control amplifying circuit 54 in the camera control unit 9 side. Thus, the gain-adjusted first or second microphone output signal 20L or 20R is supplied from the output terminal 55 to the audio mixing console 12 side.

When surrounding sounds and so on are collected by the microphone 3, the audio level is considerably fluctuated in response to the conditions of circumstance. In general, the level of sound when the sound is collected by the microphone 3 is approximately −60 dB (2.2 m VPP). When this audio signal or the like is transmitted through the coaxial cable 7, a pre-determined noise level determined by the coaxial cable (TRIAX) 7 exits so that, when the level of the sound collected by the microphone 3 is reduced, a signal-to-noise (S/N) ratio relative to the noise level determined by the coaxial cable 7 is deteriorated. On the other hand, a dynamic range of an audio signal that can be transmitted via the coaxial cable 7 is about 20 dB so that, even when the microphone level is increased, the transmission level is suppressed to approximately 20 dB.

OBJECTS AND SUMMARY OF THE INVENTION

Accordingly, it is an object of the present invention to provide an improved video camera system which can eliminate the aforenoted shortcomings and disadvantages encountered with the prior art.

More specifically, it is an object of the present invention to provide a video camera system in which characteristics of a coaxial cable can be more effectively and fully utilized.

Another object of the present invention is to provide a video camera system in which a noise component entered into a sound emanating device of a headset in a camera control unit from a camera head unit can be reduced considerably.

Still another object of the present invention is to provide a video camera system in which intercom signals of two systems can be independently transmitted as several intercom signals.

A further object of the present invention is to provide a video camera system in which a proper microphone output without distortion can be obtained in response to the change of the state in which sounds are collected by a microphone.

According to a first aspect of the present invention, a video camera system is comprised of a camera head unit having an imager device and a microphone, a camera control unit for controlling the camera head unit, a connecting device for connecting the camera head unit and the camera control unit and for transmitting a video signal of the imager device and an audio signal of the microphone from the camera head unit to the camera control unit, an output device for outputting the transmitted audio signal to the outside of the camera control unit, a switching device provided within the camera control unit for selectively permitting the output device to produce the audio signal transmitted from the microphone, and a control device provided within the camera head unit for controlling the switching device.

According to a second aspect of the present invention, a video camera system is comprised of a plurality of camera head units each having an imager device and a microphone, a camera control unit for controlling the plurality of camera head units, and a transmitting device for transmitting video signals of the imager device and audio signals of the microphones provided within the camera head units to the camera control unit. This video camera system is characterized by an audio output terminal provided within the camera control unit, a switching device for selectively permitting a plurality of audio signals of the microphones of the plurality of camera head units to be transmitted to the output terminal, and a control device provided within the camera head units for controlling the selection of the switching device, wherein the audio signals developed at the audio output terminal of the camera control unit can be selected by the camera control units.

As a third aspect of the present invention, a video camera system is comprised of a camera head unit having an imager device for generating a video signal and a microphone for generating an audio signal, a camera control unit for controlling the camera head unit, and a transmitting device for transmitting the video and audio signals from the camera head unit to the camera control unit and for transmitting a control signal from the camera control unit to the camera head unit. This video camera system is characterized by a gain varying device provided within the camera head unit for varying a gain of the audio signal from the microphone, a gain control signal generating device for controlling a gain of the gain varying device, a gain control signal input device provided within the camera control unit for receiving the gain control signal, and a supplying device for supplying the gain control signal through the transmitting device to the gain varying device, wherein the gain of the audio signal is controlled by the gain varying device provided within the camera head unit under the control of the camera control unit.

The preceding, and other objects, features and advantages of the present invention will be apparent in the following detailed description of the preferred embodiments to be taken in conjunction with the accompanying drawings, in which like reference numerals are used to identify the same or similar parts in the several views.

BRIEF DESCRIPTION OF THE DRAWINGS

FIG. 7 is a block circuit diagram showing a second embodiment of the video camera system according to the present invention.

DETAILED DESCRIPTION OF THE PREFERRED EMBODIMENTS

The present invention will now be described in detail with reference to the drawings.

Figure 6B:
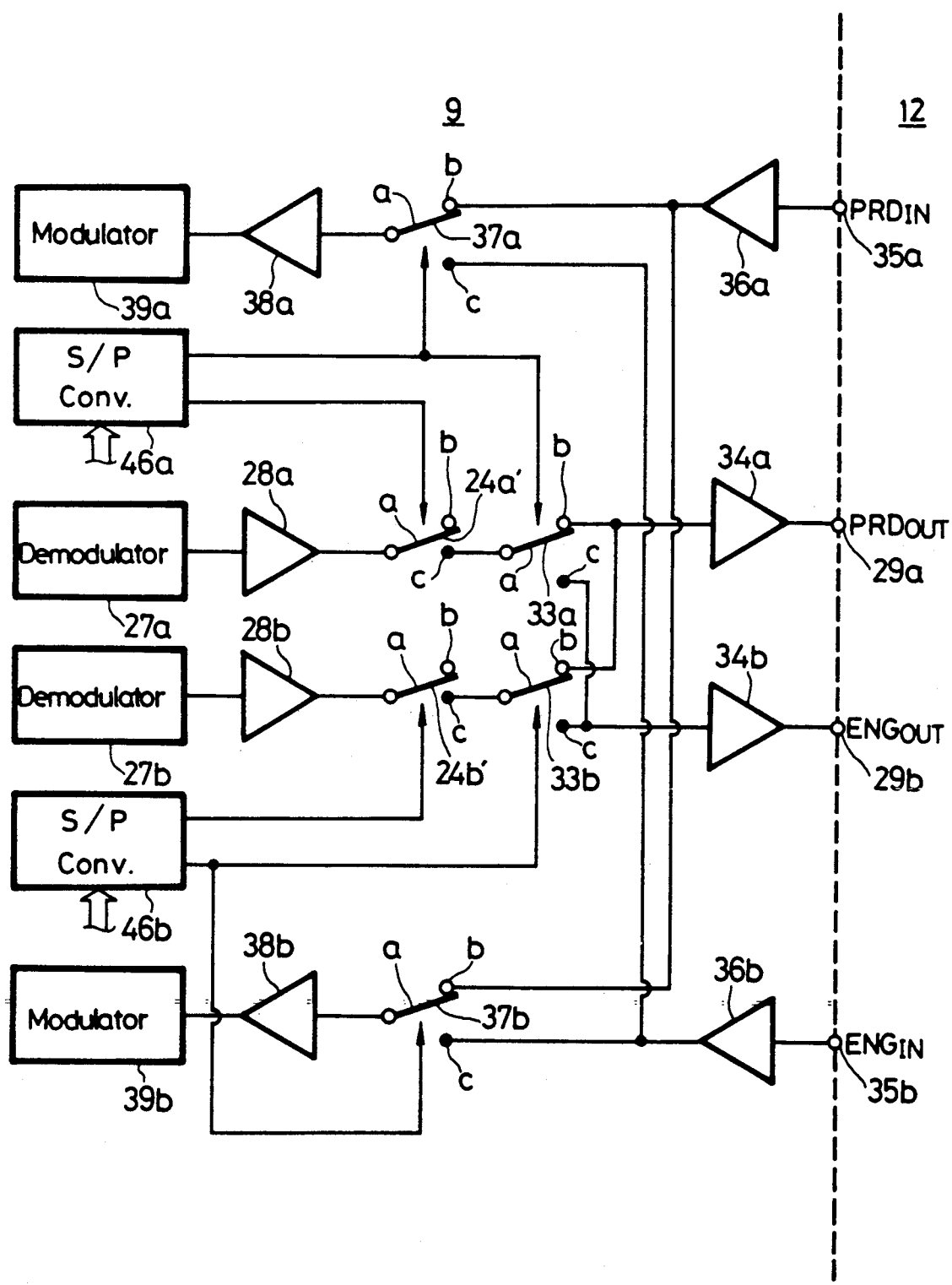
FIG. 6 (formed of FIGS. 6A and 6B drawn on two sheets of drawings to permit a suitably large scale) is a block circuit diagram showing a first embodiment of a video camera system according to the present invention.

Referring to the drawings in detail, and initially to FIG. 6, a first embodiment of a video camera system according to the present invention will be described. In FIG. 6, like parts corresponding to those of FIGS. 1 to 4 are marked with the same references and therefore need not be described in detail.

A block diagram forming FIG. 6 illustrates a video camera system in which communications are performed between both parties by utilizing intercom signals of two systems. In this embodiment, the intercom signals $PRD_{IN}$, $PRD_{OUT}$ are used to communicate the producer and the cameraman 6 and the intercom signals $ENG_{IN}$, $ENG_{OUT}$ are used to communicate the engineer and the cameraman 6.

In FIG. 6, intercoms I and II are the same in circuit arrangement, and therefore the circuit arrangements of the intercoms I and II will be described at the same time, in which case the parts corresponding to those of the intercom II are marked with the same reference numerals each having a reference letter b at the final digit thereof.

Initially, talk signals from the microphones of the headsets 5 and 5 worn by the first and second cameramen 6 and 6 (see FIG. 1) are respectively supplied to talk terminals 23a and 23b of the camera head unit 1 side. Similarly to the circuit arrangement shown in FIG. 3, the talk signals are amplified by the amplifying circuits 25a and 25b within the camera head unit 1 and, for example, AM or FM-modulated by the modulating circuits 26a and 26b. The AM- or FM-modualted signals are supplied through the coaxial cable 7 to the demodulating circuits 27a and 27b provided at the camera control unit 9 side and are thereby demodulated. The demodulated signals are amplified by the amplifying circuits 28a and 28b and are supplied through a first switch 24a', second switches 33a, 33b and amplifying circuits 34a and 34b to output terminals 29a and 29b to which there are developed the intercom signals $PRD_{OUT}$ and $ENG_{OUT}$. In the foregoing, the switch 24a, is operated similarly to the switch 24a provided at the camera head unit 1 side of FIG. 3, whereas the second switches 33a and 33b are used to change-over two systems into independent systems. The output signals at the output terminals 29a and 29b are supplied through the adding circuit 30 and the output amplifying circuit 31 of the audio mixing console 12 to a sound emanating device such as, a headphone, a speaker and the like of the headset 13 worn by the producer or engineer (mixer) 14.

Further, the intercom signal $PRD_{IN}$ and $ENG_{IN}$ from the microphone of the headset 13 worn by the producer and engineer 14 at the studio side are supplied to input terminals 35a and 35b of the camera control unit 9. The intercom signals from the producer and engineer 14 side are supplied to the amplifying circuits 36a and 36b, and the amplified signals from the amplifying circuits 36a and 36b are supplied through third switches 37a and 37b to amplifying circuits 38a and 38b, in which they are amplified one more time. The thus amplified signals are AM- or FM-modulated by modulating circuits 39a and 39b, and the modulated signals are supplied through the coaxial cables 7 to demodulating circuits 40a and 40b at the camera head unit 1 side and are thereby demodulated. The demodulated signals are amplified by output amplifiers 41a and 41b and are supplied to the headset 5 of the cameraman 6 side, thereby operating the sound emanating device such as the headphone or speaker of the headset 5 so as to emanate a sound.

Figure 1:
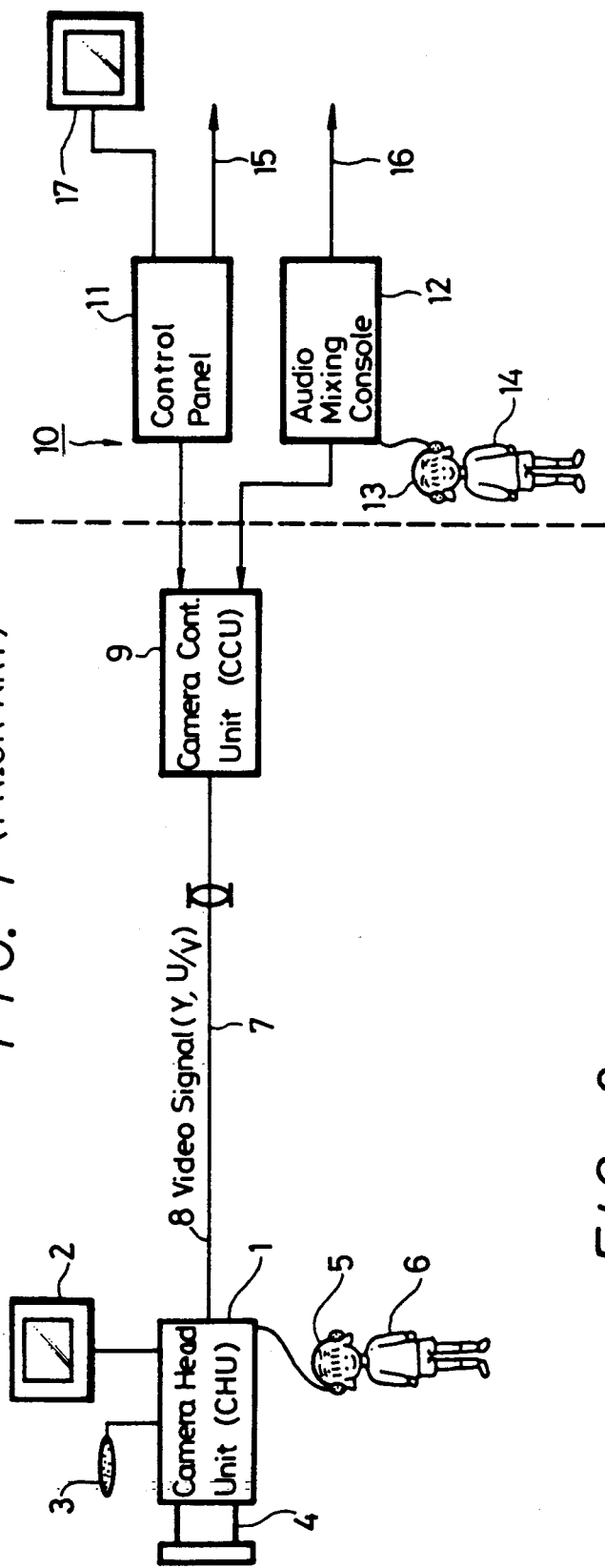
FIG. 1 is a conceptual, block diagram used to explain an example of a prior-art video camera system.
Figure 2:
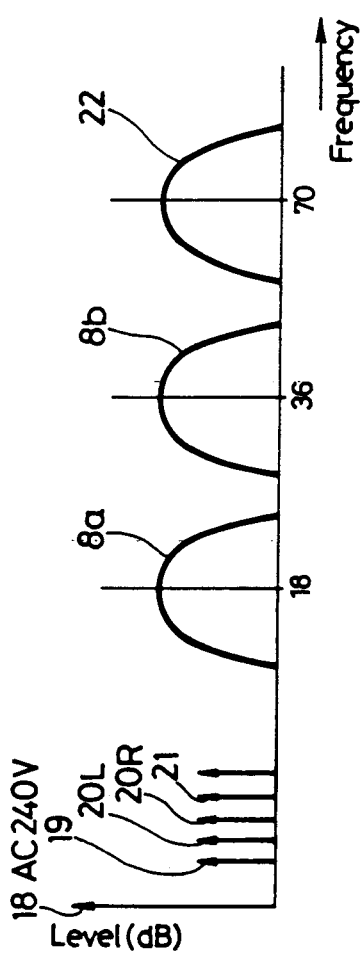
FIG. 2 is a schematic diagram of a signal allocation of various transmission signals transmitted through a coaxial cable used in the video camera system shown in FIG. 1.

The camera head unit 1 is provided with microphone switching devices for switching the headset 5, i.e., switches 44a and 44b. By the switching operation of the switches 44a and 44b, the first switches 24a' and 24b' provided at the camera control unit 9 side are changed-over. Thus, when movable contacts a of the first switches 44a and 44b are connected to their fixed contacts b, control data designated by the data 19 in FIG. 2 are supplied through the switches 44a and 44b to parallel-to-serial (P/S) converting circuits 45a and 45b, in which parallel data are converted to serial data. The converted serial data are supplied through the coaxial cables 7 to serial-to-parallel (S/P) converting circuits 46a and 46b at the camera control unit 9 side, in which serial data are converted to parallel data. Then, the movable contacts a of the first switches 24a' and 24b' are connected to their fixed contacts b thereby to place the talk system in its OFF state. Under this condition, the noise component of the coaxial cables 7 and the noise components produced in the modulating and demodulating circuits 26a, 26b and 27a, 27b are not reached to the sound emanating devices of the headset 13 of the producer or engineer 14 at the studio side so that a signal-to-noise (S/N) ratio can be improved considerably.

When the movable contacts a of the switches 44a and 44b are connected to their fixed contacts c, the first switches 24a' and 24b' are turned ON, thereby making possible.

Further, various combinations are made possible by selecting switches 43a and 43b which select the communication with the producer or engineer at the camera head unit 1 side.

The movable contacts a of the switches 43a and 43b are used to control the movable contacts a of the second and third switches 33a, 33b and 37a, 37b via the signal lines formed of the parallel-to-serial converters 45a, 45b, the coaxial cables 7 and the serial-to-parallel converters 46a and 46b, in that order. Under the condition that the movable contacts a of the switches 43a and 43b are commonly connected to the fixed contacts b as shown in FIG. 6, the control signal of the parallel-to-serial converter 46a controls this system such that the movable contacts a of the second and third switches 33a, 33b and 37a, 37b are connected to the fixed contacts b, whereby the intercoms I and II can communicate with each other via only the intercom signals PRD$_{IN}$ and PRD$_{OUT}$, whereas they cannot communicate with each other via the intercom signals ENG$_{IN}$ and ENG$_{OUT}$.

If the movable contacts a of the second and third switches 33a, 33b and 37a, 37b are connected to the fixed contacts b, the intercoms I and II can be communicated via the intercom signals ENG$_{IN}$, ENG$_{OUT}$, whereas they cannot be communicated via the intercom signals PRD$_{IN}$, PRD$_{OUT}$. If the movable contact a of the switch 43a is connected to the fixed contact b as shown in FIG. 6 and the movable contact a of the switch 43b is connected to the fixed contact c, the communication of the intercom I is made possible through the intercom signals PRD$_{IN}$ and PRD$_{OUT}$ and the communication of the intercom II becomes possible through the intercom signals ENG$_{IN}$ and ENG$_{OUT}$, respectively. Conversely, if the movable contact a of the switch 43b is connected to the fixed contact b as shown in FIG. 6 and the movable contact a of the switch 43a is connected to the fixed contact c, then the communication of the intercom I is made possible through the intercom signals ENG$_{IN}$ and ENG$_{OUT}$, and the communication of the intercom II becomes possible through the intercom signals PRD$_{IN}$ and PRD$_{OUT}$, respectively. Unlike the prior art in which the communication of the intercom I is limited to the intercom signals PRD$_{IN}$ and PRD$_{OUT}$ and the intercom II is limited to the intercom signals ENG$_{IN}$ and ENG$_{OUT}$, various independent communications corresponding to the user's status in use can be selected at the camera head unit 1 side.

FIG. 7 is a block circuit diagram showing a second embodiment of the video camera system according to the present invention. In FIG. 7, like parts corresponding to those of FIG. 6 are marked with the same references and therefore need not be described in detail. In FIG. 7, the modulating and demodulating circuits 26a, 39a, 26b, 39b, 27a, 40a, 27b, 40b provided in the receiver and talk system and the parallel-to-serial converters 45a, 45b and the serial-to-parallel converters 46a, 46b provided in the control line in the intercoms I and II shown in FIG. 6 are not shown. Further, switches 45 and 46 are connected between the amplifying circuits 36a, 34a and the input and output terminals 35a, 29b. Also, control signals such as ON, OFF control signals and the like are inputted from the control panel provided at a panel 49 in the camera control unit 9 to control the switches 37a, 37b, 33a, 33b, 45 and 46.

More precisely, the switches 24a', 24b', 33a, 33b, 37a and 37b are freely selected at the camera head unit 1 side so that, when the producer or the engineer wants to communicate with the cameraman, it is frequently observed that the communication becomes impossible because the system is turned OFF. To remove this disadvantage, control items 1 and 2 shown in the table 1 below are provided to make the communication possible with a priority of the producer or the engineer.

TABLE 1

| | control items | operations of switches |
|---|---|---|
| 1 | producer control | Connect contacts a of switches 37a, 37b, 45 to fixed contacts c |
| 2 | engineer control | Connect contacts a of switches 37a, 37b to fixed contacts c |
| 3 | single channel control | Connect contacts a of switches 37a, 37b, 33a, 33b to fixed contacts b |
| 4 | microphone OFF state | Connect contact a of switch 46 to fixed contact c |

In the control item 3, the receiver system and the talk system are forced to be connected to the producer side so that the producer side can communicate with the intercoms I and II. In the control item 4, the switch 46 is turned OFF so that all talk signals from the camera head unit 1 side are interrupted. These control operations can be carried out with ease by supplying the control signals from the control panel provided at the rear panel 49 to the gate circuits 47 and 48.

According to each embodiment of the present invention, it is possible to reduce the noise components which enter the camera control unit side from the camera head unit when the microphone of the headset is turned OFF. Further, the intercom signals of two systems which can be switched only in the producer and the engineer can be independently utilized so that the video camera system of the invention can be used in a wide variety of application fields in compliance with the user's request. In particular, unlike the prior art system in which only one system is utilized in the two systems and one camera head unit is employed, the two systems can be selectively operated.

A third embodiment of the video camera system according to the present invention will be described with reference to FIG. 8.

Figure 3:
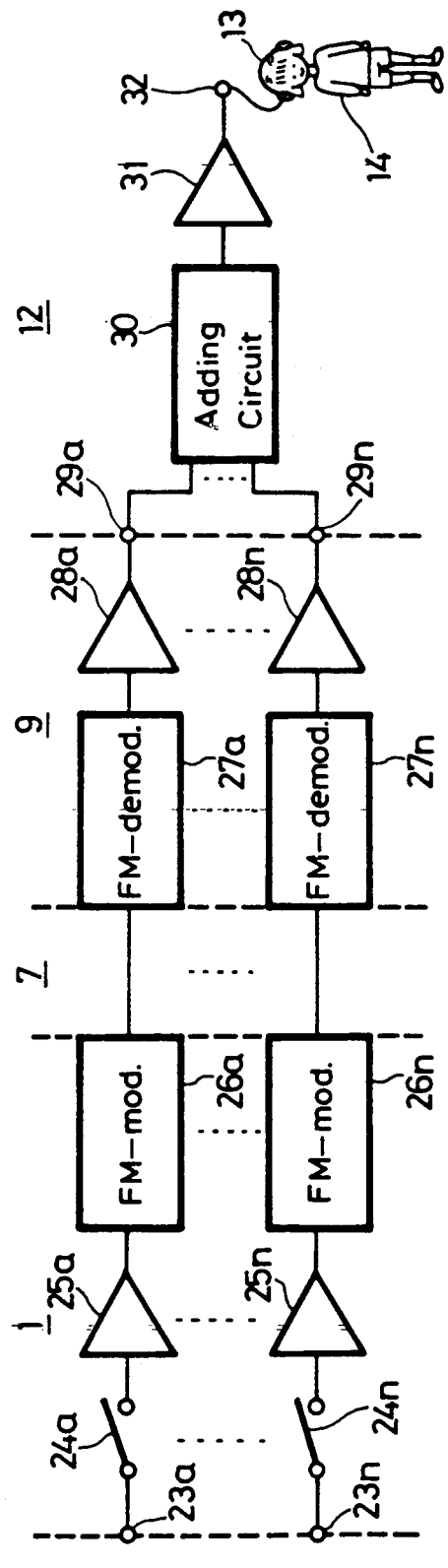
FIG. 3 is a block circuit diagram showing an example of a transmission path of the intercom signals in the prior-art video camera system shown in FIG. 1.
Figure 5:
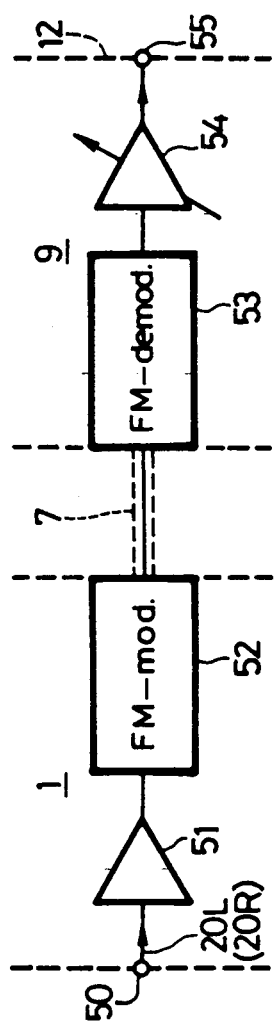
FIG. 5 is a block circuit diagram of a main portion of a transmission system of the prior-art video camera system, and to which reference will be made in explaining a prior-art method of how to adjust an audio level.
Figure 4:
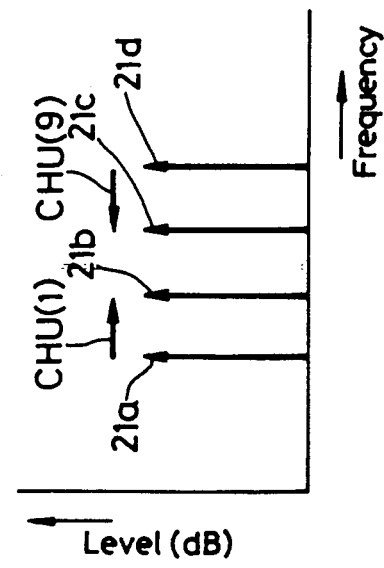
FIG. 4 is a schematic diagram of a signal allocation of various transmission signals, and to which reference will be made in explaining the shortcomings and disadvantages inherent in the prior art.
Figure 8:
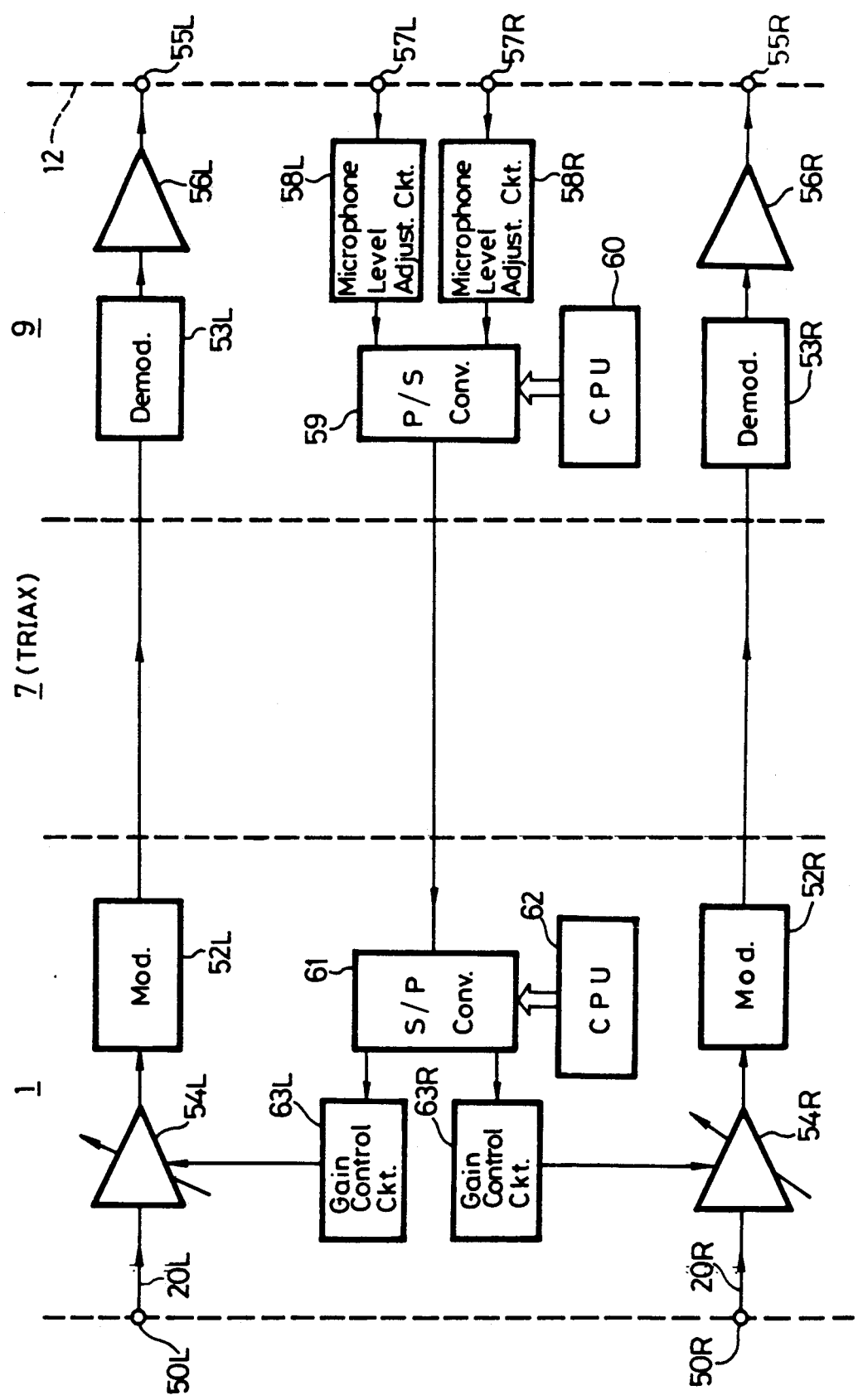
FIG. 8 is a block circuit diagram showing a third embodiment of the video camera system according to the present invention.

In FIG. 8, like parts corresponding to those of FIGS. 3 and 5 are marked with the same references and therefore need not be described in detail.

In the case of FIG. 8, the microphone 3 derives, for example, left and right channel output signals. More particularly, first microphone output signals 20L and 20R collected by the left and right microphones 3 are respectively supplied to input terminals 50L and 50R, and these output signals are supplied to variable gain control amplifying circuits 54L and 54R provided at the camera head unit 1. Similarly to FIG. 5, the output signals from the variable gain control amplifying circuits 54L and 54R are, for example, AM- or FM-modulated by the modulating circuits 52L and 52R and supplied through the coaxial cables 7 to the demodulating circuits 53L and 53R provided at the camera control unit 9 side to be demodulated. The demodulated output signals from the demodulating circuits 53L and 53R are amplified by amplifying circuits 56L and 56R and are developed at output terminals 55L and 55R, thereby supplied to the audio mixing console 12.

In this embodiment, analog DC signals or digital signals of 3 to 4 bits are applied to input terminals 57L and 57R connected to the audio mixing console 12, and are supplied to microphone level adjusting circuits 58L and 58R. The signals of constant level adjusted by the adjusting circuits 58L and 58R are supplied to a parallel-to-serial (P/S) converting circuit 59, in which parallel signals (or parallel data) are converted to serial signals (or serial data). This conversion is performed by a microcomputer or a central processing unit (CPU) 60 provided at the camera control unit 9 side. The data (signals) converted to the serial data by the parallel-to-serial converter 59 are supplied through the coaxial cable 7 to a serial-to-parallel (S/P) converting circuit 61 in the form of the data 19 shown, for example, in FIG. 2, and in which they are converted to the parallel signals or parallel data by the serial-to-parallel converter 61. This conversion is performed by a central processing unit (CPU) 62 provided at the camera head unit 1 side, and the data (or the parallel signals) are supplied to gain control circuits 63L and 63R. The gains of the variable gain control circuits 54L and 54R are varied by the output signals from the gain control circuits 63L and 63R. The microphone output signals are varied in a range of from approximately −60 dB to −40 dB by the above-described variable range in practice, whereby the first and second microphone output signals 20L and 20R can be remote-controlled from the camera control unit 9 side via the coaxial cable 7. In that case, since the audio mixer 14 can adjust the gain at the camera head unit 1 side in response to the characteristics of the coaxial cable 7, it is possible to provide a video camera system in which the microphone output signals are so large that they are suppressed within the coaxial cable or in which the microphone output signals are so small that the S/N ratio is deteriorated.

While the gains of the variable gain amplifying circuits 54L and 54R are varied by the output signals of the variable gain control circuits 63L and 63R provided at the camera head unit 1 side in the above-described embodiment, the variable gain can be varied by taps.

According to the video camera system of the present invention, the noise components entered the sound emanating device of the headset at the camera control unit 9 side from the camera head unit 1 side can be reduced. Further, it is possible to obtain the video camera system in which the intercom signals of the two systems can be independently transmitted as several intercom signals.

Furthermore, the gain can be controlled depending upon the characteristics of the coaxial cable, whereby the proper microphone output signals without distortion can be obtained in response to the change of the sound collecting condition.

Having described preferred embodiments of the invention with reference to the accompanying drawings, it is to be understood that the invention is not limited to those precise embodiments and that various changes and modifications could be effected by one skilled in the art without departing from the spirit or scope of the novel concepts of the invention as defined in the appended claims.

We claim as our invention:

1. A video camera system comprising:
   a camera head unit having imager means for generating a video signal and a microphone for generating an audio signal;
   a camera control unit for controlling said camera head unit;
   connecting means for connecting said camera head unit and said camera control unit and for transmitting said video signal of said imager means and said audio signal of said microphone in said camera head unit to said camera control unit;
   output means for outputting said audio signal from said camera control unit;
   switching means provided within said camera control unit for selectively permitting said output means to output said audio signal transmitted from said microphone; and
   control means provided within said camera head unit for controlling said switching means.

2. A video camera system comprising:
   a plurality of camera head units each having imager means for generating video signal and a microphone for generating an audio signal;
   a camera control unit for controlling said plurality of camera head units;
   transmitting means for transmitting said video signals of said imager means and said audio signals of said microphones provided within said camera head units to said camera control unit;
   an audio output terminal provided in said camera control unit;
   switching means for selectively permitting a plurality of audio signals of the microphone of said plurality of camera head units to be transmitted to said output terminal; and
   control means provided within said camera head units for controlling the selection of said switching means, wherein the audio signals developed at said audio output terminal of said camera control unit can be selected by the camera head units.

3. A video camera system according to claim 2, wherein said said switching means is provided within said camera control unit and said control means includes means for producing a control signal, means for superimposing said control signal upon said video and audio signals and means for transmitting said control signal through said transmitting means to said switching means provided within said camera control unit.

4. A video camera system according to claim 2, further comprising audio signal output means provided within said camera head units, a plurality of audio signal means provided within said camera control unit each for receiving an audio input signal, and a second switching means for selecting one of said plurality of audio input signals and for supplying a selected audio input signal to said transmitting means, wherein said audio input signals inputted from said plurality of audio signal input means are selected by said second switching means controllable by said control means and is transmitted through said transmitting means to said audio signal output means provided within said camera head unit.

5. A video camera system comprising:

a camera head unit having imager means for generating a video signal and a microphone for generating an audio signal;

a camera control unit for controlling said camera head unit;

transmitting means for transmitting said video and audio signals from said camera head unit to said camera control unit and for transmitting a gain control signal from said camera control unit to said camera head unit;

gain varying means provided within said camera head unit for varying a gain of the audio signal from said microphone;

gain control signal generating means for generating said gain control signal to control the gain of said gain varying means;

gain control signal input means provided within said camera control unit for receiving said gain control signal from said gain control generating means; and supplying means for supplying said gain control signal through said transmitting means from said camera control unit to said gain varying means, wherein the gain of said audio signal from said microphone is controlled by said gain varying means provided within said camera head unit under the control of said camera control unit.

* * * * *